United States Patent
Pendleton et al.

(10) Patent No.: US 12,060,083 B2
(45) Date of Patent: Aug. 13, 2024

(54) PLANNING WITH DYNAMIC STATE A TRAJECTORY OF AN AUTONOMOUS VEHICLE

(71) Applicant: MOTIONAL AD LLC, Boston, MA (US)

(72) Inventors: Scott Drew Pendleton, Singapore (SG); Hans Andersen, Singapore (SG)

(73) Assignee: Motional AD LLC, Boston, MA (US)

( * ) Notice: Subject to any disclaimer, the term of this patent is extended or adjusted under 35 U.S.C. 154(b) by 160 days.

(21) Appl. No.: 17/239,155

(22) Filed: Apr. 23, 2021

(65) Prior Publication Data

US 2022/0340172 A1 Oct. 27, 2022

(51) Int. Cl.
 *B60W 60/00* (2020.01)
 *B60W 30/09* (2012.01)

(52) U.S. Cl.
 CPC ........ *B60W 60/0027* (2020.02); *B60W 30/09* (2013.01); *B60W 60/0016* (2020.02);
 (Continued)

(58) Field of Classification Search
 CPC ............. B60W 60/0027; B60W 30/09; B60W 60/0016; B60W 2554/4029;
 (Continued)

(56) References Cited

U.S. PATENT DOCUMENTS

2016/0375901 A1 12/2016 Di Cairano et al.
2020/0142417 A1 5/2020 Hudecek
 (Continued)

FOREIGN PATENT DOCUMENTS

CN 111319615 A 6/2020
WO WO 2019/231455 A1 12/2019
WO WO 2021/231452 A1 11/2021

OTHER PUBLICATIONS

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.
Great Britain Office Action issued for Application No. GB 2116794. 5, dated May 6, 2022.
Great Britain Office Action issued for Application No. GB 2116794. 5, dated Nov. 22, 2022.
 (Continued)

*Primary Examiner* — James J Lee
*Assistant Examiner* — Alexander George Matta
(74) *Attorney, Agent, or Firm* — Knobbe, Martens, Olson & Bear LLP

(57) ABSTRACT

This disclosure describes an autonomous vehicle configured to obtain sensor data associated with objects proximate a projected route of the autonomous vehicle, determine static constraints that limit a trajectory of the autonomous vehicle along the projected route based on non-temporal risks associated with a first subset of the f objects, predict a position and speed of the autonomous vehicle as a function of time along the projected route based on the static constraints, identify temporal risks associated with a second subset of the objects based on the predicted position and speed of the autonomous vehicle, determine dynamic constraints that further limit the trajectory of the autonomous vehicle along the projected route to help the autonomous vehicle avoid the temporal risks associated with the second subset of the objects, and adjust the trajectory of the autonomous vehicle in accordance with the static constraints and the dynamic constraints.

24 Claims, 17 Drawing Sheets

(52) U.S. Cl.
CPC .............. *B60W 2554/4029* (2020.02); *B60W 2554/408* (2020.02); *B60W 2554/80* (2020.02)

(58) Field of Classification Search
CPC ....... B60W 2554/408; B60W 2554/80; B60W 2552/53; B60W 30/0956; B60W 30/18154; B60W 60/00; B60W 30/085; B60W 60/0017; B60W 60/0011; B60W 30/08; B60W 30/10; B60W 30/181; B60W 40/02; B60W 40/105; B60W 2050/0005; B60W 2050/009; B60W 2420/40; B60W 2420/42; B60W 2420/52; B60W 2420/54; B60W 2520/04; B60W 2520/10; B60W 2555/60; B60W 2720/103; G06N 20/00; B60Y 2400/30
See application file for complete search history.

(56) References Cited

U.S. PATENT DOCUMENTS

| | | | | |
|---|---|---|---|---|
| 2020/0406928 | A1* | 12/2020 | Rausch | B60W 40/09 |
| 2021/0009148 | A1* | 1/2021 | Oguro | B60W 30/146 |
| 2021/0053561 | A1* | 2/2021 | Beller | G08G 1/166 |
| 2021/0237769 | A1* | 8/2021 | Ostafew | G08G 1/163 |
| 2021/0370921 | A1* | 12/2021 | Silva | B60W 60/0027 |
| 2021/0375133 | A1* | 12/2021 | Pöschke | G08G 1/095 |
| 2022/0081002 | A1 | 3/2022 | Xiao | |
| 2022/0105959 | A1* | 4/2022 | Hartnett | B60W 60/0027 |
| 2022/0250613 | A1* | 8/2022 | Iyer | B60W 50/16 |
| 2023/0377460 | A1* | 11/2023 | Sivanesan | H04W 4/44 |

OTHER PUBLICATIONS

Korean Office Action issued for Application No. KR 10-2021-0192251, dated Nov. 30, 2023.

* cited by examiner

PLANNING WITH DYNAMIC STATE A TRAJECTORY OF AN AUTONOMOUS VEHICLE

FIELD

This description relates to a computer system for detecting one or more objects in the environment surrounding an autonomous vehicle and predicting a behavior of the one or more objects using machine learning techniques.

BACKGROUND

Autonomous vehicles can be used to transport people and/or cargo (e.g., packages, objects, or other items) from one location to another. For example, an autonomous vehicle can navigate to the location of a person, wait for the person to board the autonomous vehicle, and navigate to a specified destination (e.g., a location selected by the person). To navigate in the environment, these autonomous vehicles are equipped with various types of sensors to detect objects in the surroundings.

SUMMARY

Anticipating the behavior of objects being tracked by the sensors can be difficult. The subject matter described in this specification is directed to a computer system and techniques for detecting and predicting the behavior of objects in an environment surrounding an autonomous vehicle. Generally, the computer system is configured to receive input from one or more sensors of the vehicle, detect one or more objects in the environment surrounding the vehicle based on the received input, and operate the vehicle based upon the predicted behavior of the objects.

In particular, a system is disclosed that includes at least one processor and at least one memory storing instructions thereon that, when executed by the at least one processor, cause the at least one processor to perform operations comprising: obtaining sensor data generated by a sensor of an autonomous vehicle, the sensor data being associated with a plurality of objects proximate a projected route of the autonomous vehicle; determining static constraints that limit a trajectory of the autonomous vehicle along the projected route based on non-temporal risks associated with a first subset of the plurality of objects; predicting a position and speed of the autonomous vehicle as a function of time along the projected route based on the static constraints; identifying temporal risks associated with a second subset of the plurality of objects based on the predicted position and speed of the autonomous vehicle; determining dynamic constraints that further limit the trajectory of the autonomous vehicle along the projected route to help the autonomous vehicle avoid the temporal risks associated with the second subset of the plurality of objects; adjusting the trajectory of the autonomous vehicle in accordance with the static constraints and the dynamic constraints; and navigating the autonomous vehicle in accordance with the adjusted trajectory.

A non-transitory computer-readable storage medium is disclosed that includes instructions stored thereon that, when executed by at least one processor, cause the at least one processor to carry out operations comprising: obtaining sensor data generated by a sensor of an autonomous vehicle, the sensor data being associated with a plurality of objects proximate a projected route of the autonomous vehicle; determining static constraints that limit a trajectory of the autonomous vehicle along the projected route based on non-temporal risks associated with a first subset of the plurality of objects; predicting a position and speed of the autonomous vehicle as a function of time along the projected route based on the static constraints; identifying temporal risks associated with a second subset of the plurality of objects based on the predicted position and speed of the autonomous vehicle; determining dynamic constraints that further limit the trajectory of the autonomous vehicle along the projected route to help the autonomous vehicle avoid the temporal risks associated with the second subset of the plurality of objects; adjusting the trajectory of the autonomous vehicle in accordance with the static constraints and the dynamic constraints; and navigating the autonomous vehicle in accordance with the adjusted trajectory.

A method performed by an autonomous vehicle following a projected route is disclosed. The method includes: obtaining sensor data generated by a sensor of an autonomous vehicle, the sensor data being associated with a plurality of objects proximate a projected route of the autonomous vehicle; determining static constraints that limit a trajectory of the autonomous vehicle along the projected route based on non-temporal risks associated with a first subset of the plurality of objects; predicting a position and speed of the autonomous vehicle as a function of time along the projected route based on the static constraints; identifying temporal risks associated with a second subset of the plurality of objects based on the predicted position and speed of the autonomous vehicle; determining dynamic constraints that further limit the trajectory of the autonomous vehicle along the projected route to help the autonomous vehicle avoid the temporal risks associated with the second subset of the plurality of objects; adjusting the trajectory of the autonomous vehicle in accordance with the static constraints and the dynamic constraints; and navigating the autonomous vehicle in accordance with the adjusted trajectory.

These and other aspects, features, and implementations can be expressed as methods, apparatuses, systems, components, program products, means or steps for performing a function, and in other ways.

These and other aspects, features, and implementations will become apparent from the following descriptions, including the claims.

DETAILED DESCRIPTION

Figure 1:
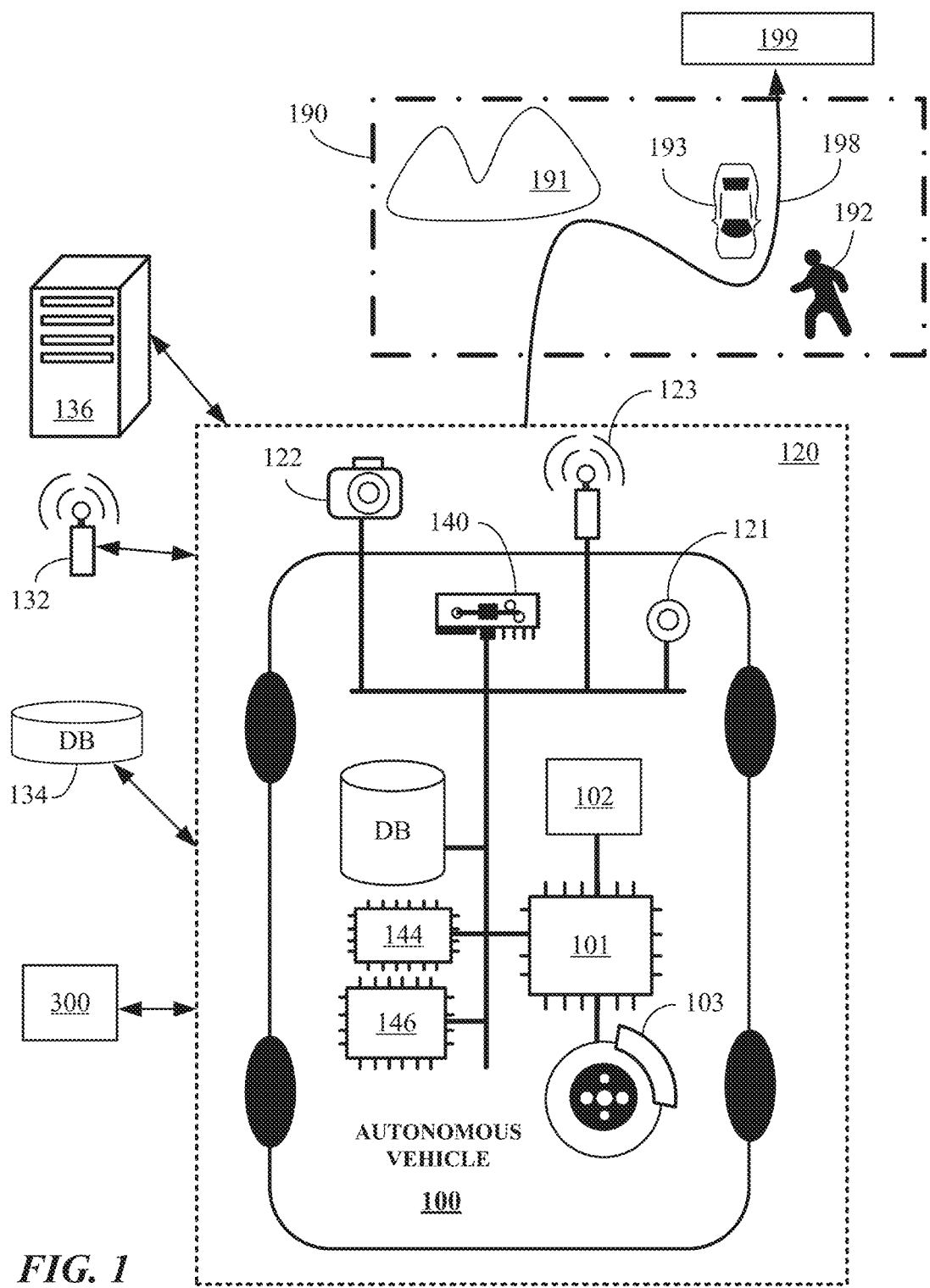
FIG. 1 shows an example of an autonomous vehicle having autonomous capability.

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. Hardware Overview
3. Autonomous Vehicle Architecture
4. Autonomous Vehicle Inputs
5. Autonomous Vehicle Planning
6. Autonomous Vehicle Control
7. Computing System for Object Detection Using Pillars
8. Example Point Clouds and Pillars
9. Example Process for Detecting Objects and Operating the Vehicle Based on the Detection of the Objects General Overview Autonomous vehicles driving in complex environments (e.g., an urban environment) pose a great technological challenge. In order for autonomous vehicles to navigate these environments, the vehicles detect various types of objects such as vehicles, pedestrians, and bikes in real-time using sensors such as LIDAR, optical imagery and/or RADAR. While these sensors are able to identify and track objects, predicting the behavior of the objects can be challenging and treating the tracked objects too conservatively can result in autonomous vehicles being unable to function. The disclosed embodiments include a system and techniques for predicting the behavior of and efficiently avoiding detected objects.

In particular, the system and techniques described herein implement machine learning (e.g., a neural network) that can correlate sensor data from detected objects with sensor data from previously tracked objects. The autonomous vehicle is then able to use the behavior of the previously tracked objects to predict the movement of detected objects proximate a projected route of travel of the autonomous vehicle. The predicted movement can then be used to identify a temporal zone likely to contain the detected object. When the predicted movement is of sufficient quality, the autonomous vehicle can adjust speed and/or position to efficiently avoid any unintended collisions with one or more dynamic objects.

Hardware Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to a second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle, and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless specified otherwise.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 200 described below with respect to FIG. 2.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, WiFi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Figure 2:
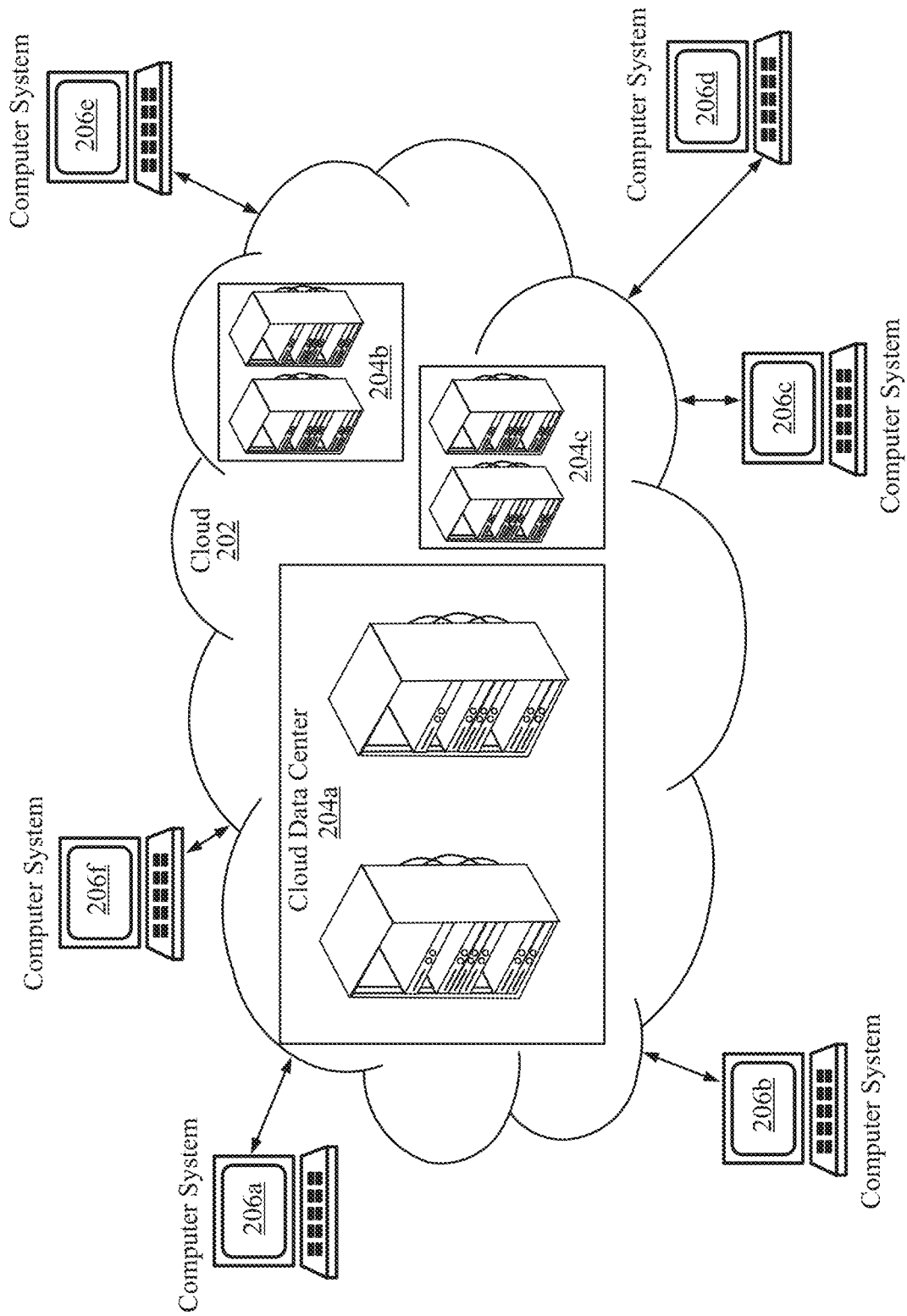
FIG. 2 illustrates an example "cloud" computing environment.

FIG. 2 illustrates an example "cloud" computing environment. Cloud computing is a model of service delivery for enabling convenient, on-demand network access to a shared pool of configurable computing resources (e.g., networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Figure 3:
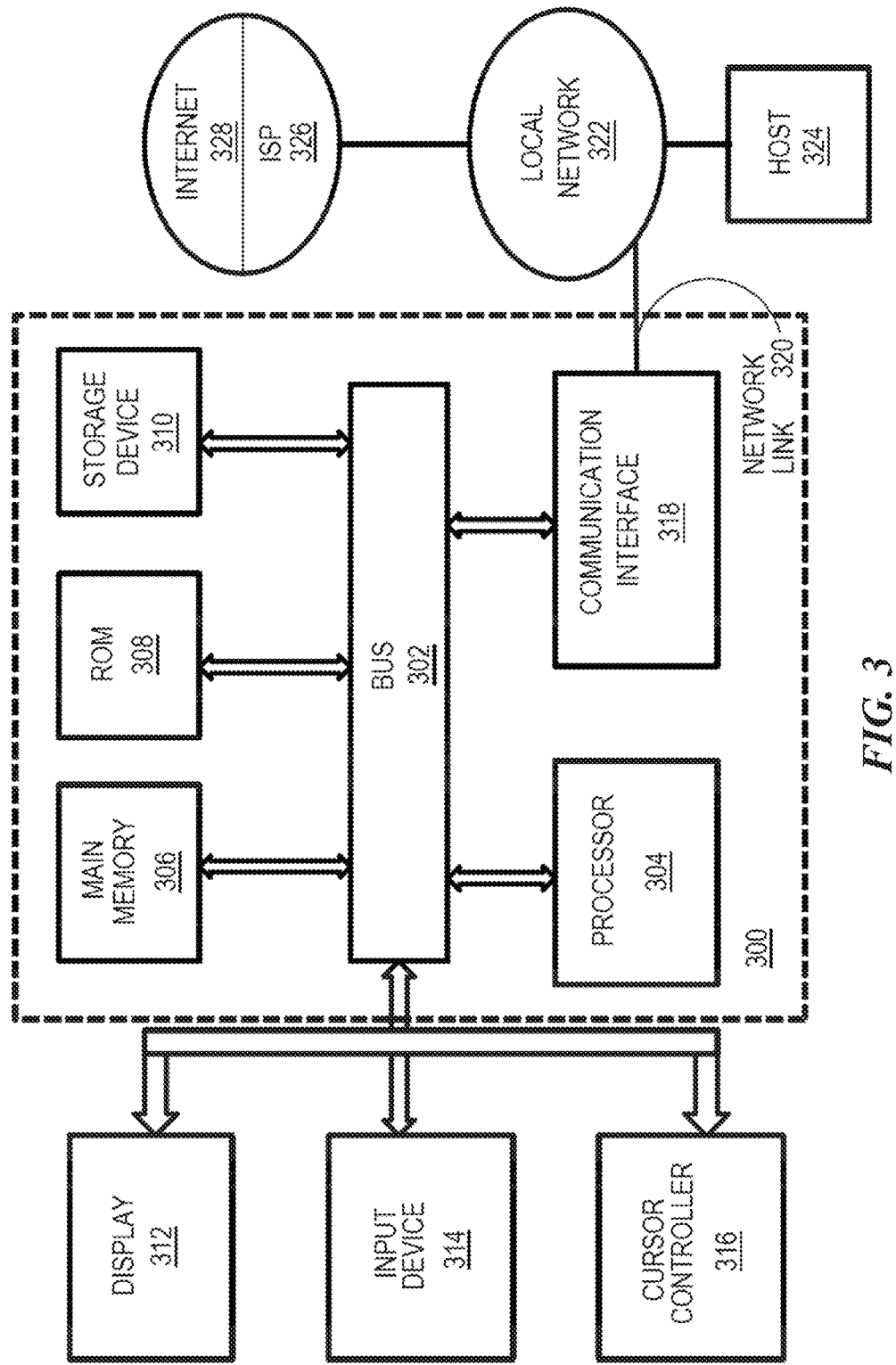
FIG. 3 illustrates a computer system.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
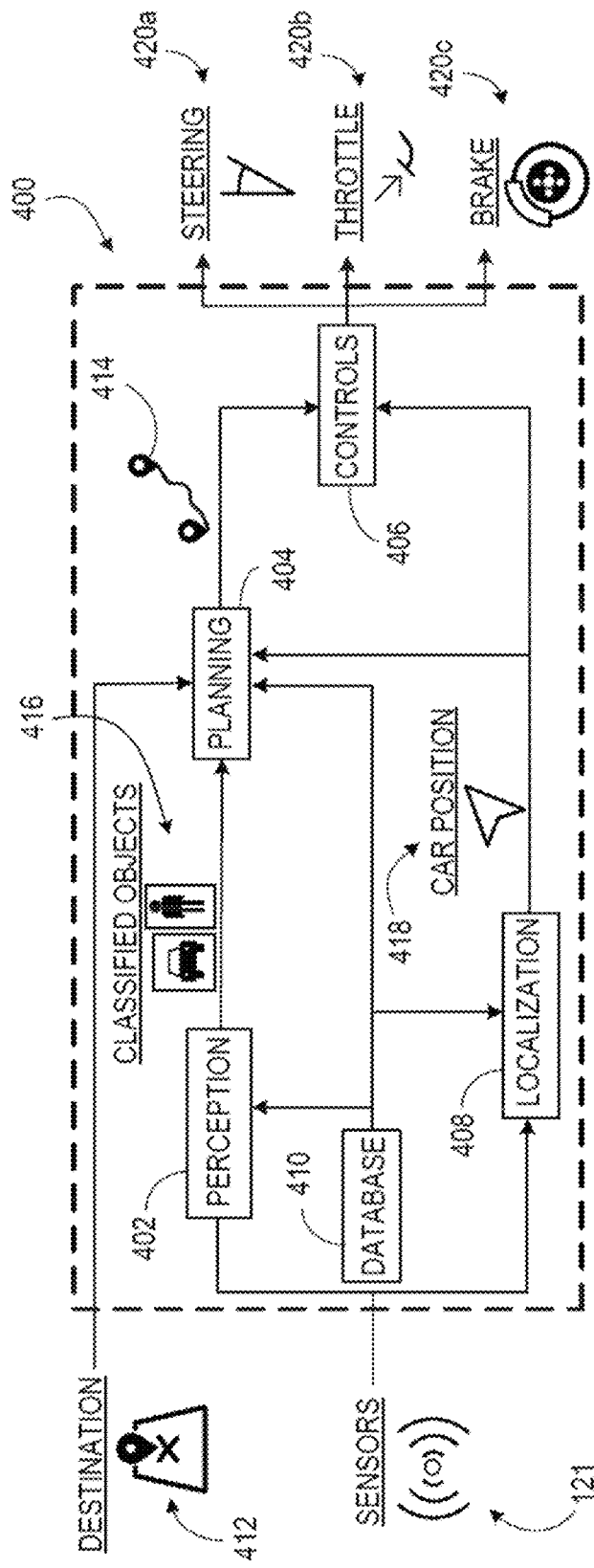
FIG. 4 shows an example architecture for an autonomous vehicle.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
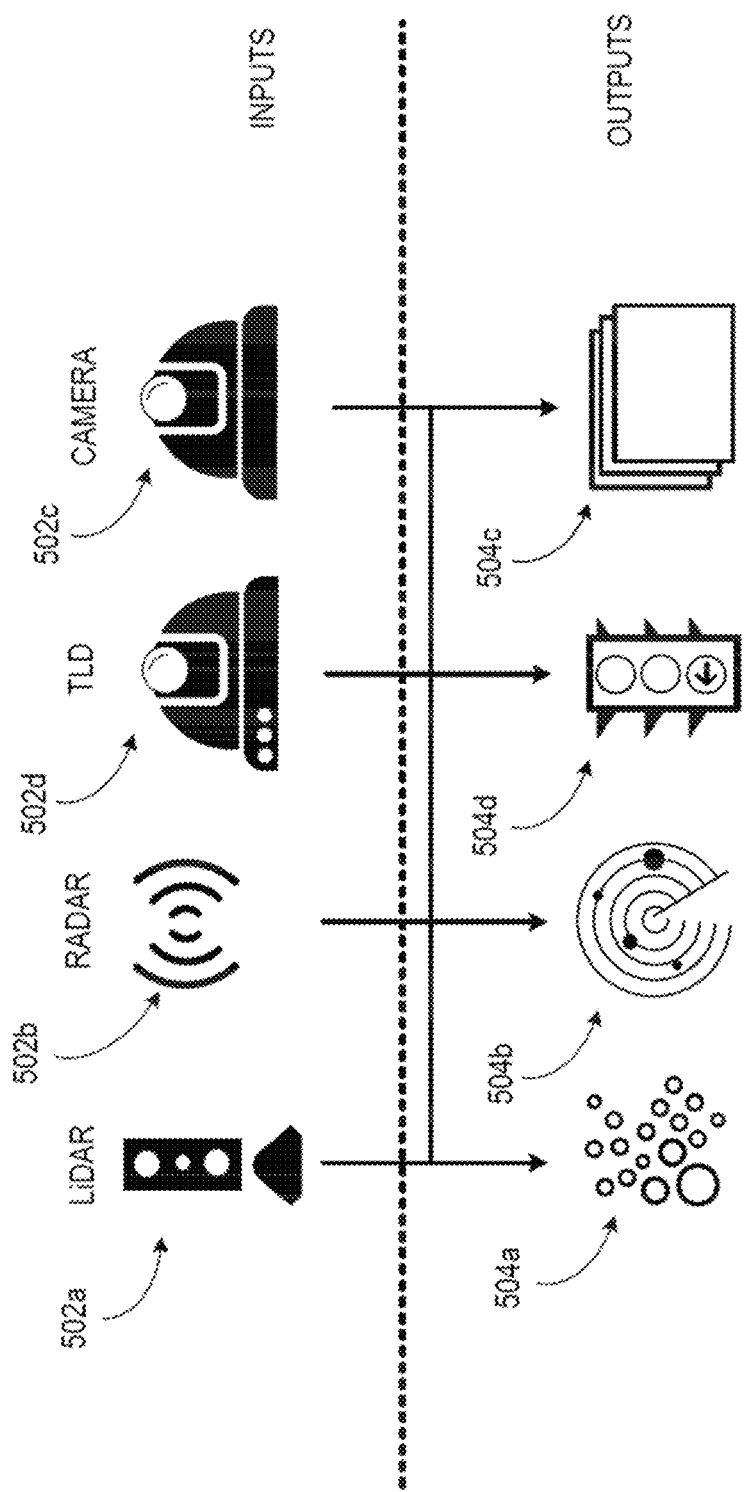
FIG. 5 shows an example of inputs and outputs that may be used by a perception module.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 504a-d are combined using a sensor fusion technique. Thus, either the individual outputs 504a-d are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
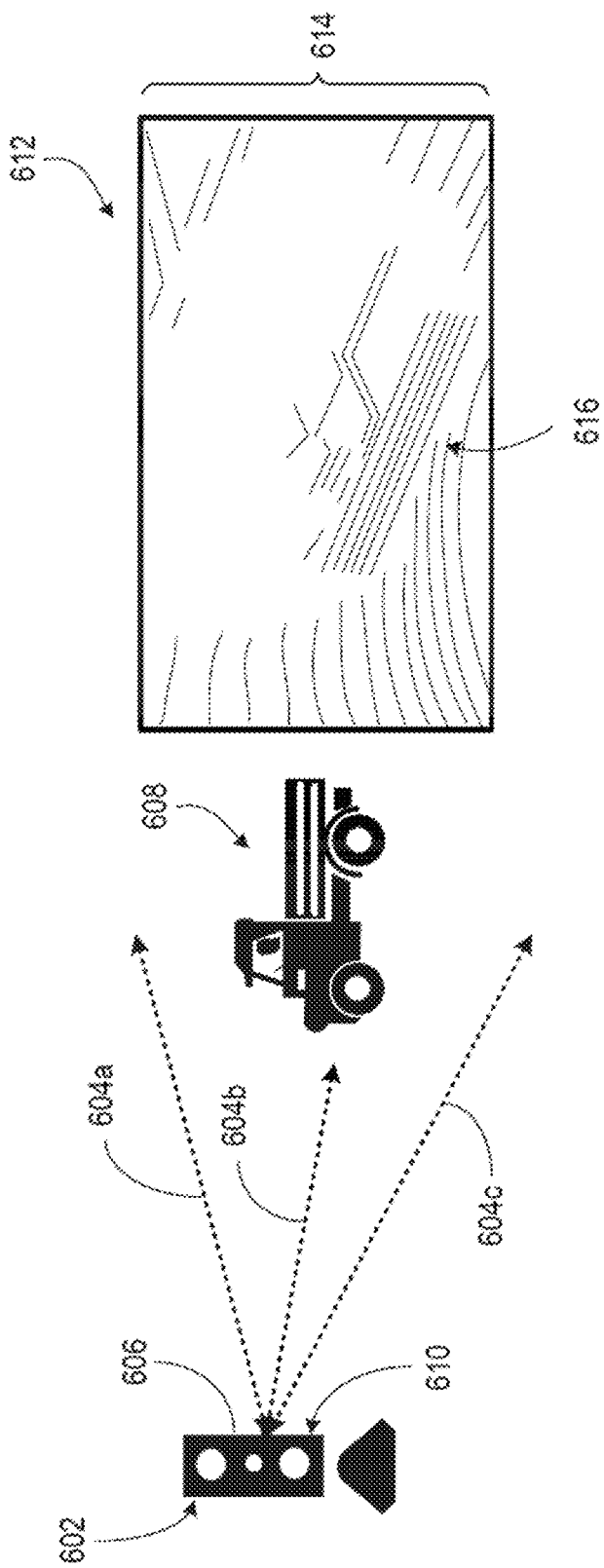
FIG. 6 shows an example of a LiDAR system.

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
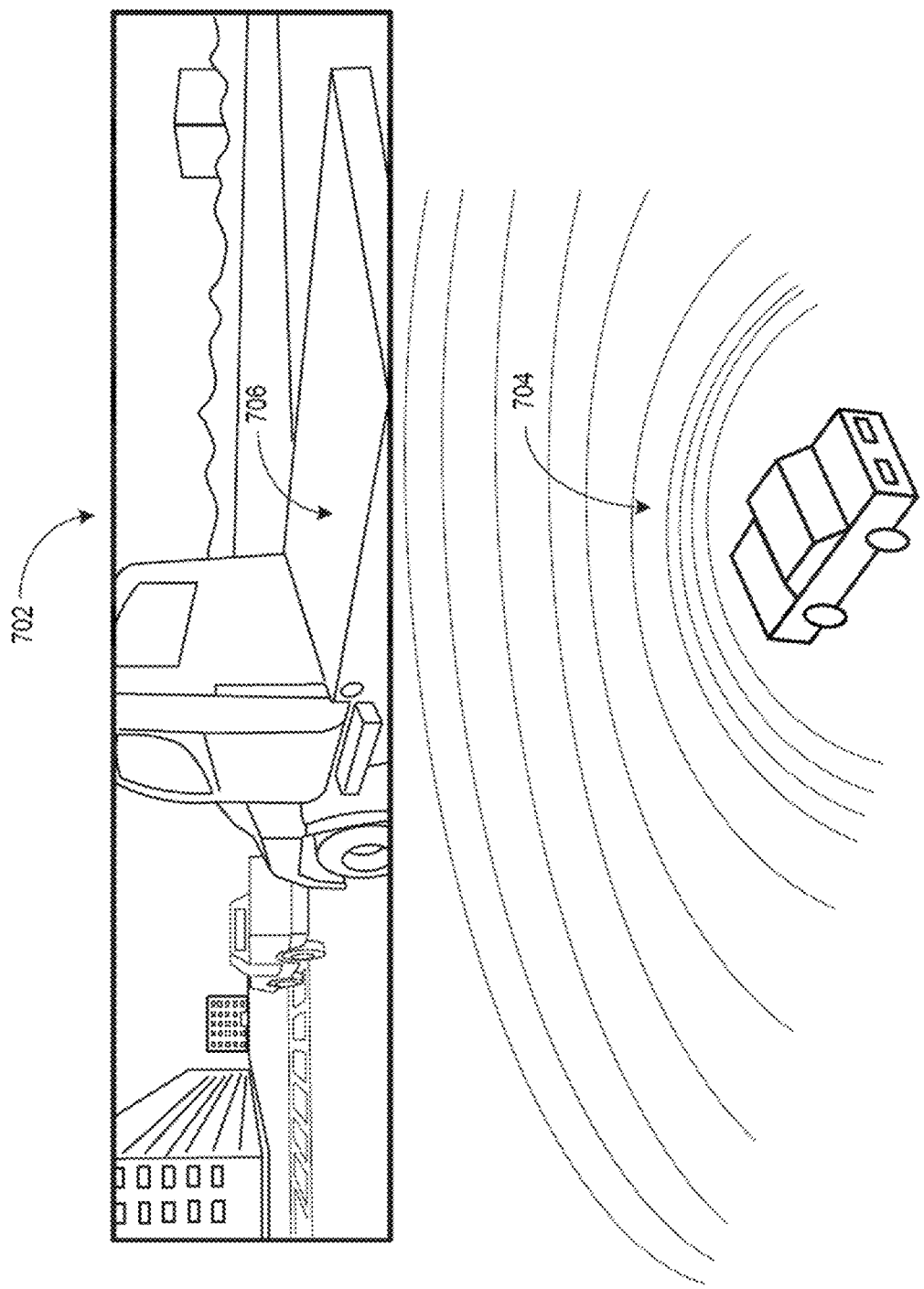
FIG. 7 shows the LiDAR system in operation.

FIG. 7 shows the LiDAR system 602 in operation. In the scenario shown in this figure, the AV 100 receives both camera system output 504c in the form of an image 702 and LiDAR system output 504a in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
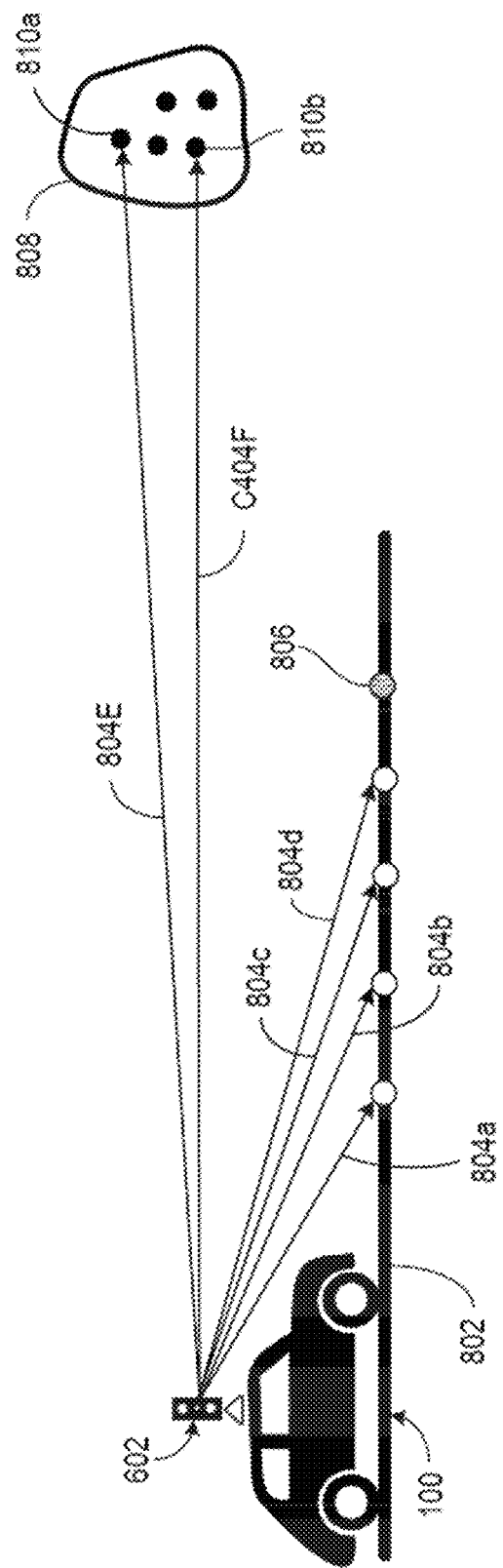
FIG. 8 shows the operation of the LiDAR system in additional detail.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the AV 100 can determine that the object 808 is present.

Path Planning

Figure 9:
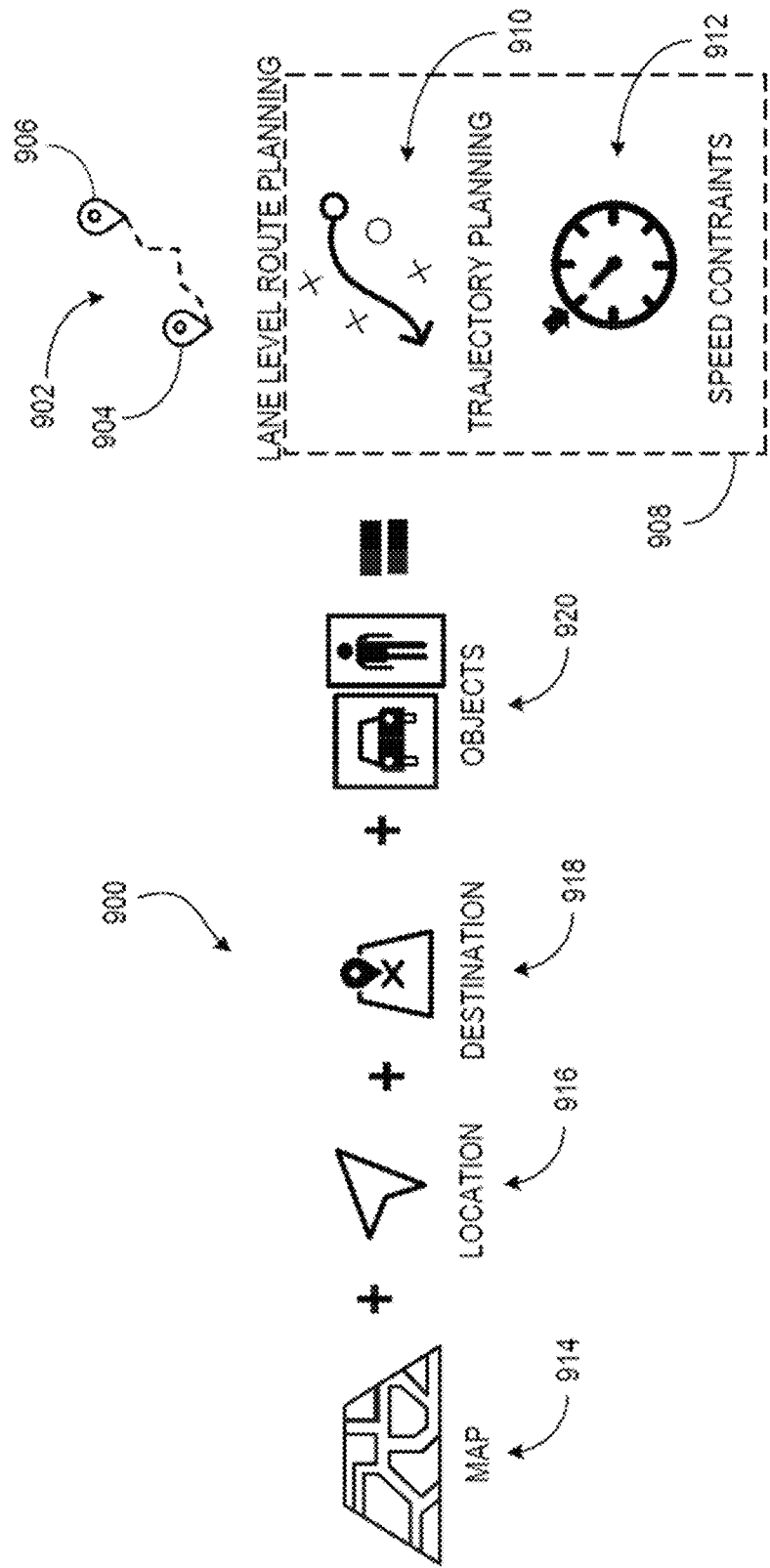
FIG. 9 shows a block diagram of the relationships between inputs and outputs of a planning module.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
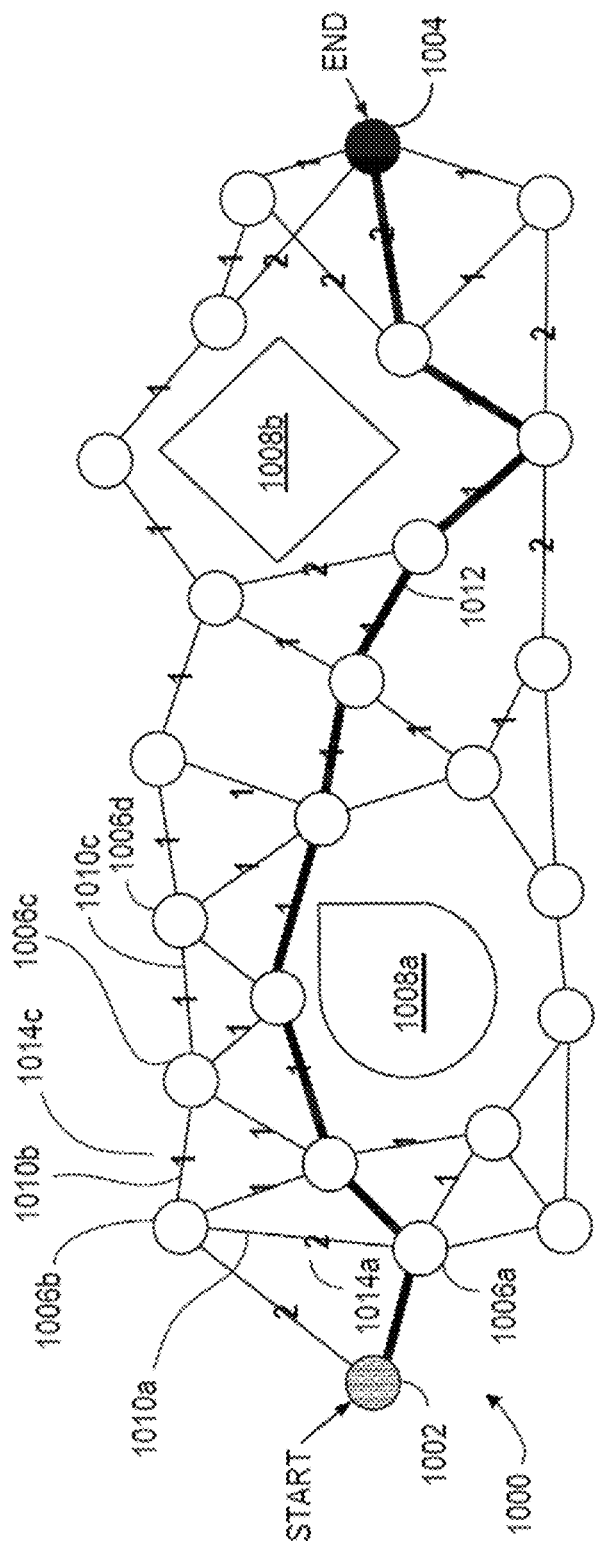
FIG. 10 shows a directed graph used in path planning.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g, in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by an AV 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the AV 100, e.g., other automobiles, pedestrians, or other entities with which the AV 100 cannot share physical space. In an embodiment, some or all of the objects 1008a-b are a static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for an AV 100 to travel between one node 1006a and the other node 1006b, e.g., without having to travel to an intermediate node before arriving at the other node 1006b. (When we refer to an AV 100 traveling between nodes, we mean that the AV 100 travels between the two physical positions represented by the respective nodes.) The edges 1010a-c are often bidirectional, in the sense that an AV 100 travels from a first node to a second node, or from the second node to the first node. In an embodiment, edges 1010a-c are unidirectional, in the sense that an AV 100 can travel from a first node to a second node, however the AV 100 cannot travel from the second node to the first node. Edges 1010a-c are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010a-c has an associated cost 1014a-b. The cost 1014a-b is a value that represents the resources that will be expended if the AV 100 chooses that edge. A typical resource is time. For example, if one edge 1010a represents a physical distance that is twice that as another edge 1010b, then the associated cost 1014a of the first edge 1010a may be twice the associated cost 1014b of the second edge 1010b. Other factors that affect time include expected traffic, number of intersections, speed limit, etc. Another typical resource is fuel economy. Two edges 1010a-b may represent the same physical distance, but one edge 1010a may require more fuel than another edge 1010b, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
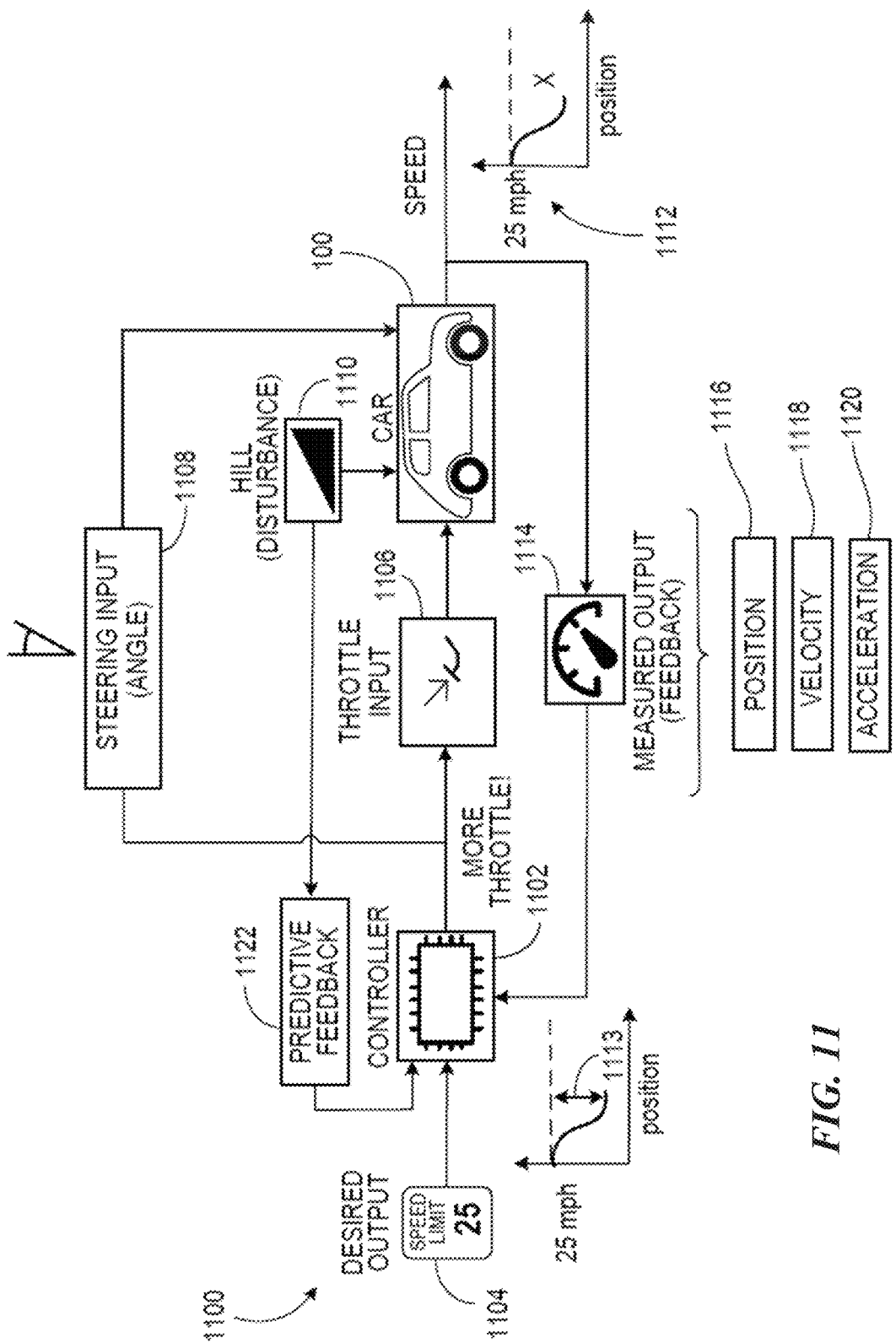
FIG. 11 shows a block diagram of the inputs and outputs of a control module.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 308, and storage device 310, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
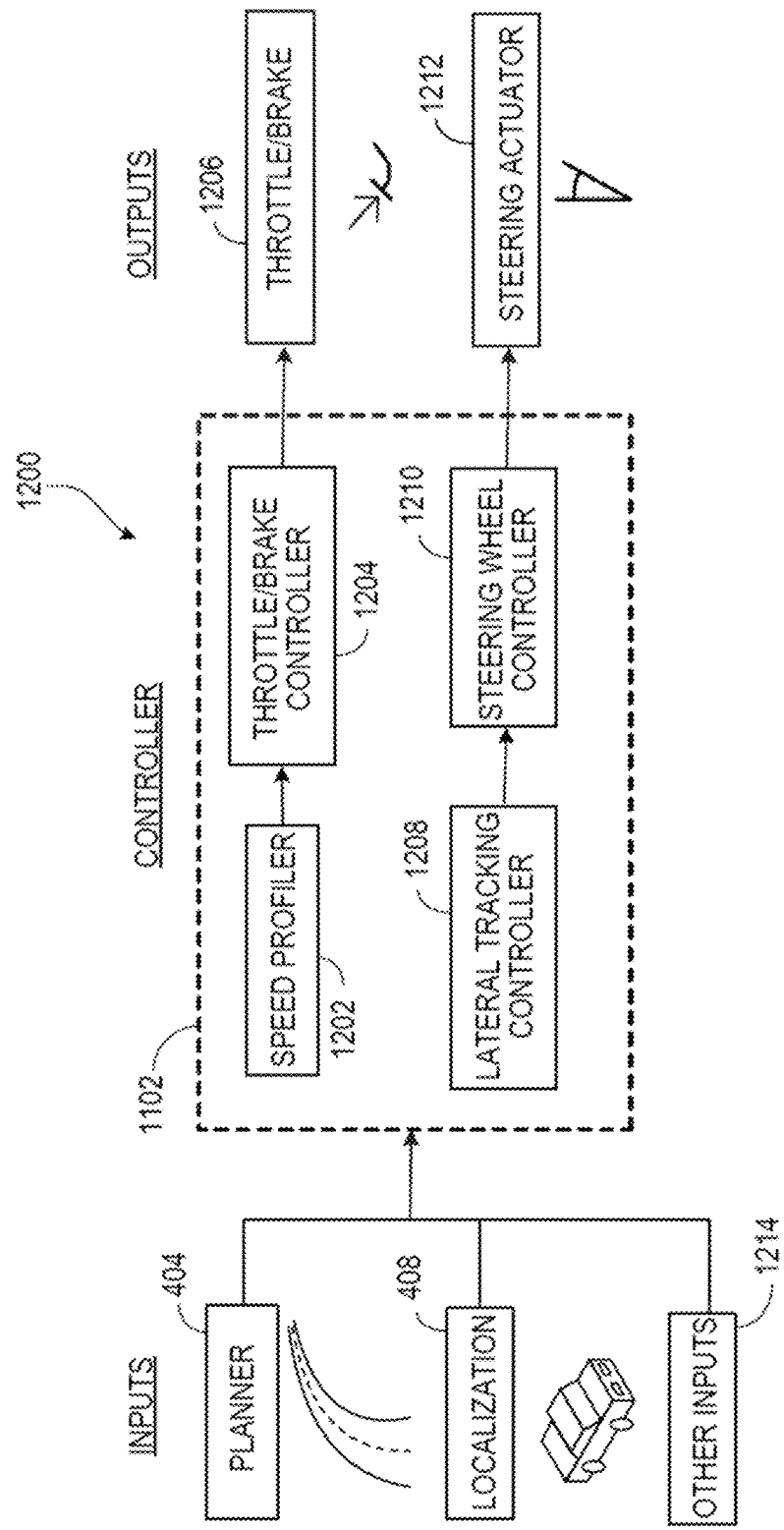
FIG. 12 shows a block diagram of the inputs, outputs, and components of a controller.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1210 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Planning with Dynamic State

Figure 13A:
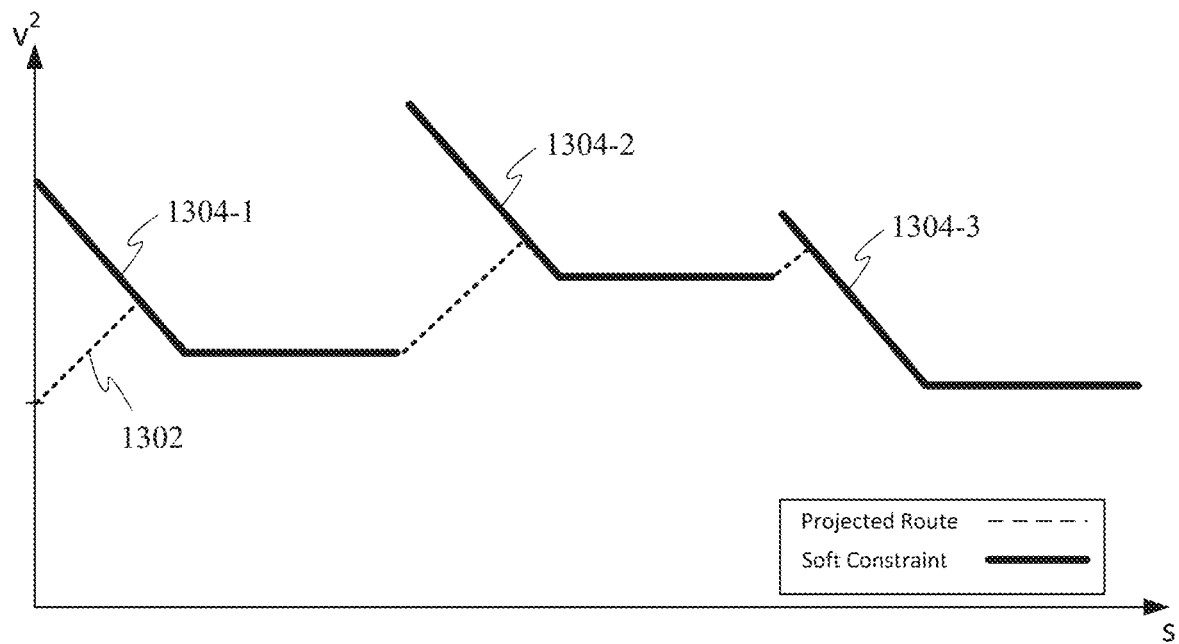
FIGS. 13A-13B show graphs of velocity squared versus position illustrating how soft and hard constraints affect a projected route and maximum acceleration/deceleration profiles associated with an autonomous vehicle in accordance with some embodiments.
Figure 13B:
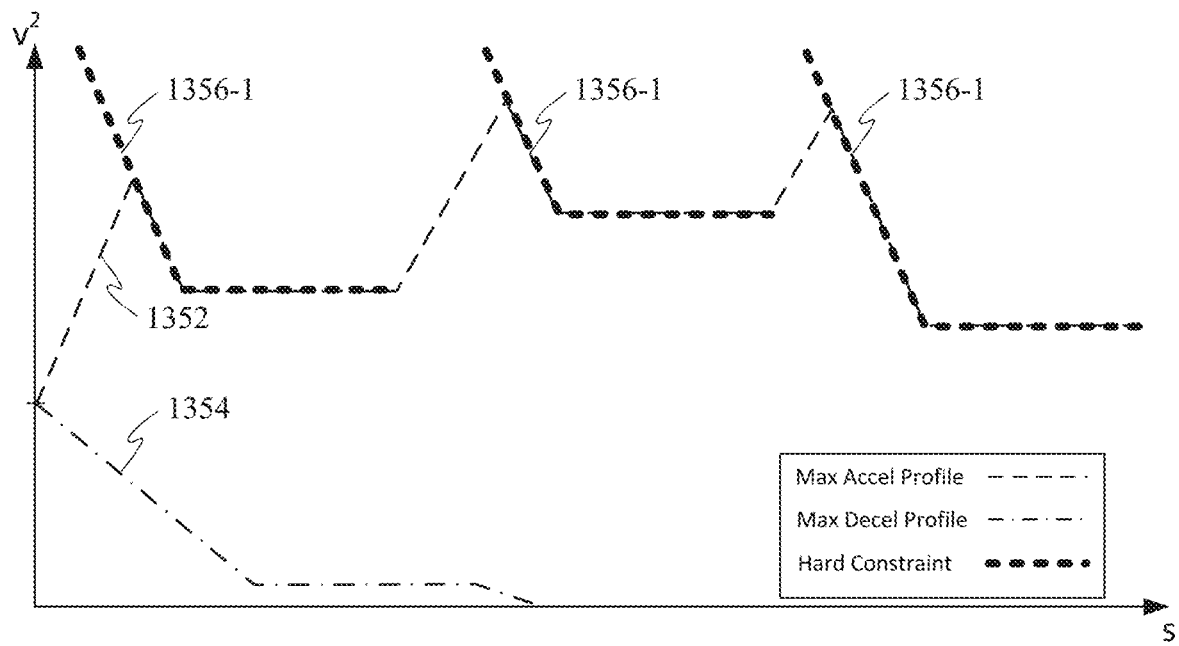

FIGS. 13A-13B show graphs of velocity squared versus position illustrating how soft and hard constraints affect a projected route and maximum acceleration/deceleration profiles associated with AV 100 in accordance with some embodiments. In particular, FIG. 13A shows how a maximum velocity associated with particular segments of projected route 1302 is bounded by soft constraints 1304. Soft constraints 1304 can result from many different road conditions. For example, constraint 1304-1 can correspond with a maximum recommended speed for a particular curve, constraint 1304-2 can correspond with a reduced speed limit associated with a construction zone and constraint 1304-3 can correspond with a vehicle reducing speed to accommodate a rougher or more slippery road surface. In each case, a velocity achieved by AV 100 is reduced over the course of a particular stretch of road for a number of different reasons.

FIG. 13B show maximum acceleration profile 1352 and maximum deceleration profile 1354 achievable by AV 100 in some embodiments. Maximum acceleration profile 1352 is affected by hard constraints 1356. Hard constraint 1356-1 can correspond with an acceleration limit designed to prevent damage to a powertrain of AV 100. Hard constraint 1356-2 can correspond with a maximum acceleration limit that prevents tipping given the curvature of a road across which AV 100 is traversing and hard constraint 1356-3 can correspond to AV 100 approaching its maximum speed. It should be noted that a user taking manual control of AV 100 might be able to exceed the max deceleration profile or drive past one of hard constraints 1356, but that hard constraints 1356 represent a hard limit for what the autonomous driving system is able to perform without user intervention or the engagement of a system such as a collision avoidance system.

Constraints can also be characterized as static and dynamic. A static constraint being one considered unlikely to change during the passage of AV 100 and a dynamic constrain being one considered likely to relocate or change in state during the passage of AV 100. As will be described in greater detail below, processors associated with the autonomous driving system can generally be configured to determine static constraints before dynamic constraints so that the system knows what options are available for handling objects likely to change position or state when determining the dynamic constraints that ameliorate risks associated with less predictable objects.

Figure 14A:
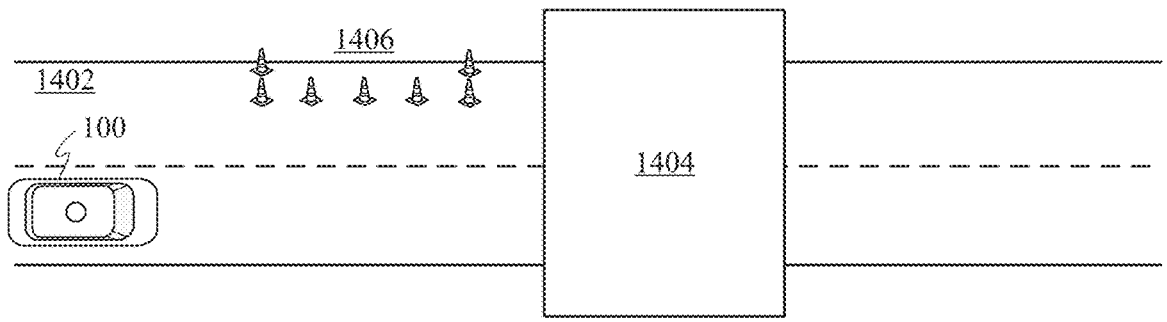
FIG. 14A shows a top down view of an autonomous vehicle traversing a street as a traffic light at a traffic light junction turns yellow.

FIG. 14A shows a top down view of AV 100 traversing a street 1402 as a traffic light at traffic light junction 1404 turns yellow. Following the maximum kinematic profile depicted in FIG. 14B, AV 100 can get through intersection 1404 prior to the traffic light turning red (e.g., based on typical yellow light timings) without exceeding hard constraint 1 (depicted in FIG. 14B). Hard constraint 1 can represent a maximum speed limit for street 1402. In this scenario, there is a construction zone 1406 on the left side of the road (relative to the direction of travel of AV 100). Hard constraint 2 (depicted in FIG. 14B) represents a constraint AV 100 must follow when passing by construction zone 1406 that prevents AV 100 from exceeding what has been determined to be a maximum safe speed in close proximity to construction zone 1406. AV 100 can be configured to determine a maximum safe speed in a number of different ways. In some embodiments, a default maximum speed limit for construction zones on city streets is used. In some embodiments, posted construction zone speed limits are used in lieu of the default maximum speed limit when available. In some embodiments, AV 100 can be configured to determine a maximum safe speed limit dynamically based on one or more factors such as proximity to construction zone 1406 at closest approach, other vehicular traffic and activity at construction zone 1406.

Figure 14B:
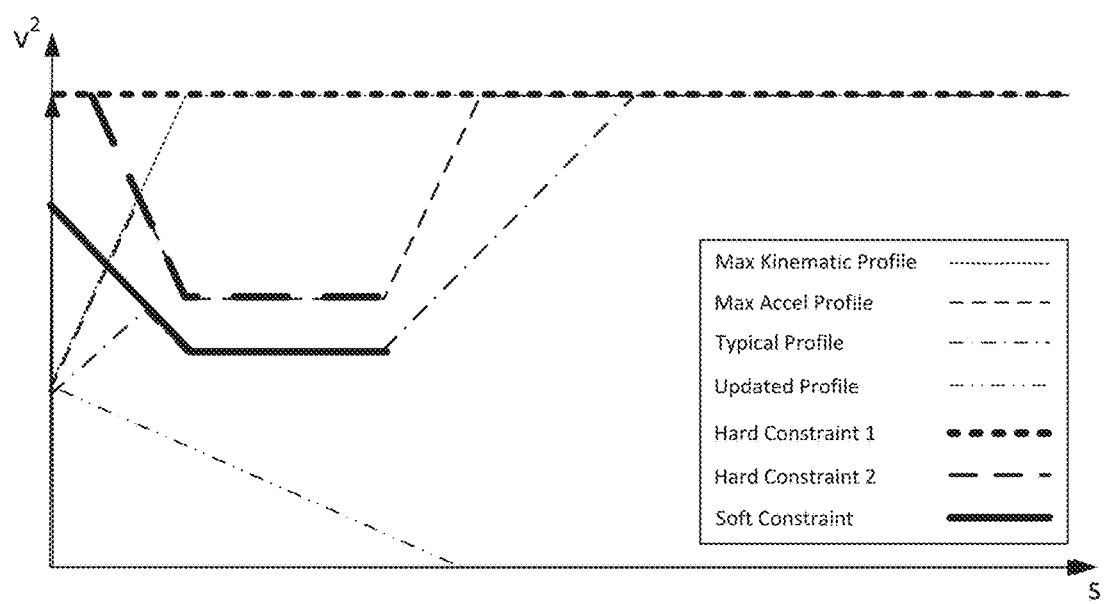
FIG. 14B shows a graph of velocity squared versus position illustrating how a construction zone proximate the traffic light junction depicted in FIG. 14A affects the ability of the autonomous vehicle to get through the traffic light junction before it turns red in accordance with some embodiments.

In the scenario shown in FIG. 14A, when following the max acceleration profile shown in FIG. 14B, AV 100 cannot accelerate up to the maximum speed limit represented by hard constraint 1 until after AV 100 has entered intersection 1404 due to hard constraint 2. Hard constraint 2 is considered to be a static constraint since the cones associated with construction zone 1406 are unlikely to go away prior to AV 100 passing through intersection 1404. For this reason, AV 100 is able to determine that it cannot safely get through intersection 1404 before the traffic light turns red without violating hard constraint 2. In this scenario, AV 100 can apply a dynamic constraint represented by the updated profile shown in FIG. 14B, which allows AV 100 to stop before entering intersection 1404 without violating any system constraints. The updated constraint is characterized as a dynamic constraint because AV 100 is not entirely sure what the duration of the yellow light will be. FIG. 14B also depicts a typical profile with less aggressive acceleration and a more conservative speed limit for construction zone 1406 depicted as the soft constraint line. Clearly, AV 100 is also unable to enter intersection 1404 prior to the traffic light turning red. It should be appreciated that in some scenarios, choosing the maximum acceleration profile or even following the typical profile will allow AV 100 to clear an intersection without running a red light or having a collision. AV 100 will generally choose the profile that optimizes safety and comfort.

Figure 15A:
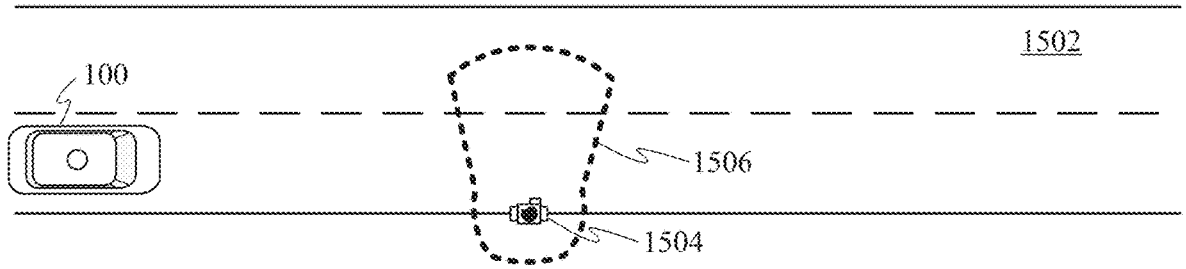
FIGS. 15A-15C show a scenario in which an autonomous vehicle utilizes the described embodiments to respond to a pedestrian crossing the street.
Figure 15B:
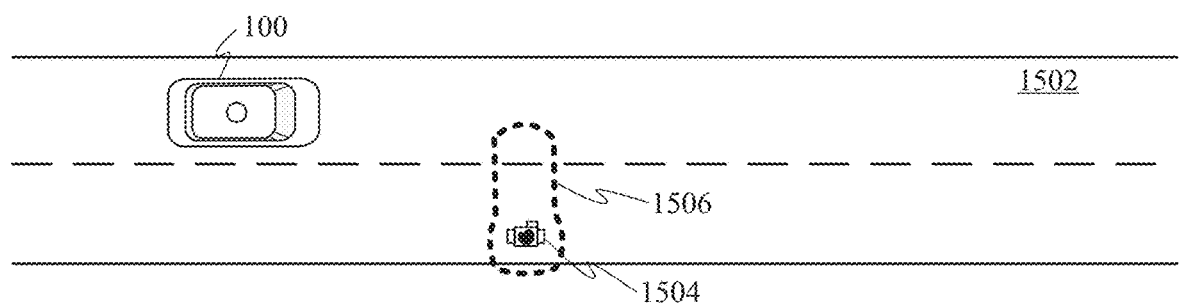
Figure 15C:
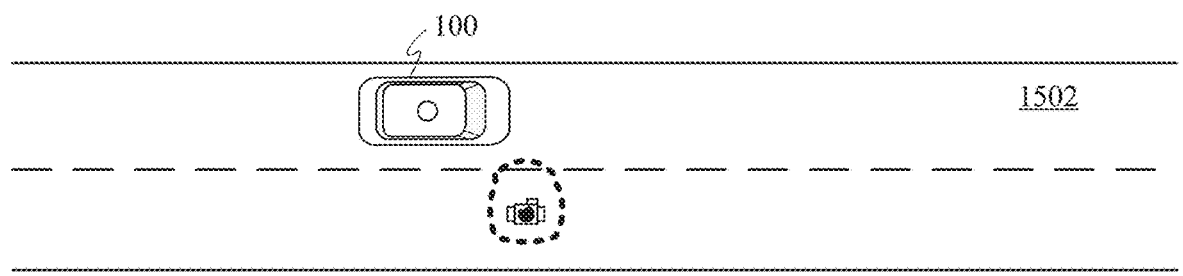

FIGS. 15A-15C show a scenario in which a pedestrian 1504 (e.g., a jaywalker) crosses street 1502. In FIG. 15A, AV 100 detects pedestrian 1504 beginning to cross street 1502. Upon detecting pedestrian 1504 entering street 1502, AV 100 determines that at the current speed of AV 100, which for purposes of this example is the maximum posted speed limit for this street, and based on a predicted behavior of pedestrian 1504, pedestrian 1504 could be positioned in either of the two lanes of street 1502. The potential locations for pedestrian 1504 at a predicted time at which AV 100 has its closest approach to pedestrian 1504 is depicted in FIG. 15A as temporal zone 1506 and is based on predicted future movement of pedestrian 1504. In some embodiments, the likelihood of the object being within an identified temporal zone is at a level of above 99%. In this scenario, AV 100 can determine the size and shape of temporal zone 1506 to be relatively large (e.g., several times the size of pedestrian 1504; compared to temporal zone 1506 in FIGS. 15B and 15C described below) since a historical database accessible by AV 100 indicates pedestrians often travel unpredictably when not in a crosswalk, e.g., instead of travelling directly across the street as would be expected in a crosswalk scenario. In some embodiments, the historical database is stored onboard AV 100, while in other embodiments at least a portion of the database is stored outside of AV 100. In the current scenario, due to the close proximity of temporal zone 1506 to AV 100, AV 100 determines it is unable to fully stop prior to intersecting temporal zone 1506. In this situation, AV 100 will move to the left lane (e.g., the upper lane in FIG. 15A) because AV 100 is able to determine from temporal zone 1506 that pedestrian 1504 is less likely to occupy the left lane than the right lane (e.g., the lower lane in FIG. 15A) due to the relative areas of temporal zone 1506 occupying the right and left lanes.

FIG. 15B shows that after AV 100 changes lanes, temporal zone 1506 still occupies a portion of the left lane. FIG. 15B also depicts that temporal zone 1506 shrinks (e.g., is reduced in size and/or changes shape) as AV 100 approaches pedestrian 1504 on account of AV 100 being more confident about the position 1506 that pedestrian 1504 will occupy at the time of closest approach between AV 100 and pedestrian 1504. Confidence levels can increase for a number of reasons including at least the following: (1) there is less time for pedestrian 1504 to move as AV 100 approaches pedestrian 1504, thereby reducing the possible distance that can be covered by pedestrian 1504; and (2) AV 100 has had time to measure a speed and direction in which pedestrian 1504 is travelling, thereby allowing AV 100 to more accurately predict the behavior (i.e. direction of travel) of pedestrian 1504.

In the case that the maximum posted speed limit is considered by AV 100 to be a soft constraint, AV 100 can proceed to accelerate above the maximum posted speed limit to reduce the amount of time pedestrian 1504 has to reach the left lane. In some embodiments, AV 100 is authorized to accelerate to a speed a threshold amount above the posted maximum speed limit when doing so is performed as part of a collision avoidance maneuver. FIG. 15C shows how by accelerating above the posted maximum speed limit, temporal zone 1506 is further reduced in size, and is pushed back sufficiently into the right lane for AV 100 to avoid pedestrian 1504 with a high degree of certainty. This example shows how AV 100 is able to bypass the posted speed limit, when considered to be a soft constraint, in order to avoid the possibility of striking the pedestrian (e.g., avoiding striking the pedestrian is a higher priority than obeying the posted speed limit). While AV 100 will generally attempt to follow all constraints, this shows how in certain circumstances AV 100 will prioritize following a hard dynamic constraint (pedestrian) over a soft static constraint (posted speed limit). It should be noted that in cases where pedestrian 1504 is a pedestrian crossing street 1502 at a crosswalk, an initial shape of temporal zone 1506 can be more defined by this type of pavement marking, thereby allowing AV 100 to make a more refined initial projection of size and shape of the pedestrian (e.g., an initial projection that does not change significantly over time (e.g., less than 50%, less than 25%, less than 10%)). An object determined to be a pedestrian using an authorized means of crossing street 1502 can also be assigned a different classification. For example, a pedestrian in a crosswalk might be determined to have a more predictable speed than a pedestrian that is not in a crosswalk, resulting in the temporal zone for the pedestrian being smaller and easier for AV 100 to accommodate.

While FIGS. 15A-15C show only a single dynamic object being tracked and avoided, in some embodiments, AV 100 can track multiple dynamic and/or static objects (e.g., concurrently), such that one or more of the objects (e.g., each detected and/or tracked object) acts as a constraint limiting possible actions that can be taken by AV 100 without risking a collision. Because the behavior of the detected objects can be more accurately predicted given the historical data correlation, AV 100 is more likely to be able to take actions that help it avoid collisions in difficult situations.

Figure 16A:
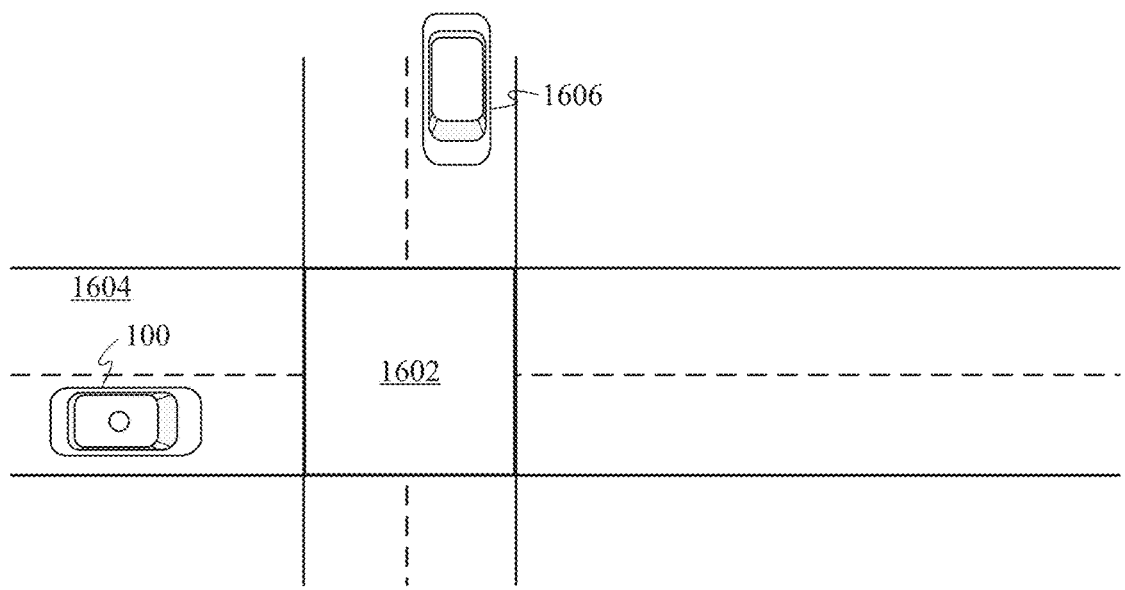
FIG. 16A shows a scenario in which an autonomous vehicle is approaching an intersection and determines, based on the behavior of another vehicle, that the other vehicle is likely to enter the intersection at the same time as the autonomous vehicle.
Figure 16B:
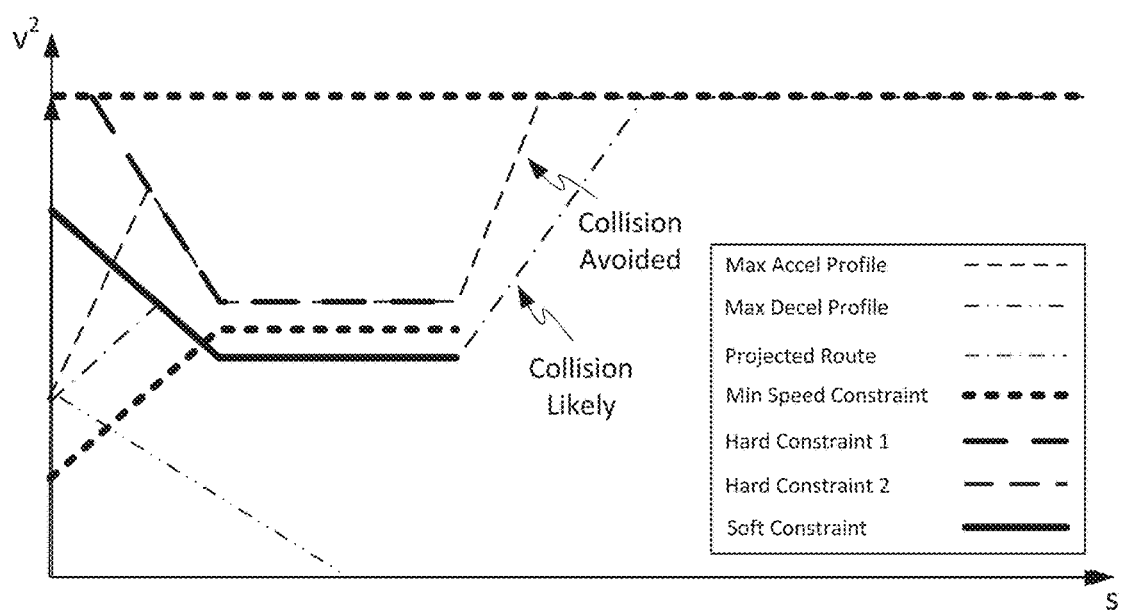
FIG. 16B shows a graph of velocity squared versus position illustrating how a minimum speed profile can be applied to get the autonomous vehicle depicted in FIG. 16A through the intersection safely in accordance with some embodiments.

FIG. 16A shows a scenario in which AV 100 is approaching intersection 1602 on road 1604 and determines based on the behavior of vehicle 1606 and its current projected route shown in FIG. 16B that vehicle 1606 is likely to enter intersection 1602 at the same time as AV 100. AV 100 also determines that it is too close to intersection 1602 to stop in time to avoid entering intersection 1602, as shown by the maximum deceleration profile line depicted in FIG. 16B. In some embodiments, the slope of the maximum deceleration profile line can depend upon a following distance of a vehicle trailing the autonomous vehicle. The slope in this case may correspond to the maximum deceleration the autonomous vehicle determines that it can make without causing the trailing vehicle to impact the autonomous vehicle. In response to there not being enough room to stop the autonomous vehicle, AV 100 determines that the most effective way to avoid a collision with vehicle 1606 is to accelerate as it approaches intersection 1602 and maintain a higher than projected speed through intersection 1602. In order to get AV 100 to perform this action, an additional constraint can be introduced to AV 100 that requires AV 100 to meet a minimum speed constraint designed to allow AV 100 to get through intersection 1602 prior to vehicle 1606 with a determined amount of certainty. FIG. 16B depicts the minimum speed constraint, which dictates a higher velocity than the projected route but a lower velocity than the max acceleration profile. This allows AV 100 to follow a relatively narrow window that can keep it safe from collision with vehicle 1606. In some embodiments, AV 100 can be configured to instead adopt the maximum acceleration profile depicted in FIG. 16B to maximize the amount of space between AV 100 and vehicle 1606.

Figure 17:
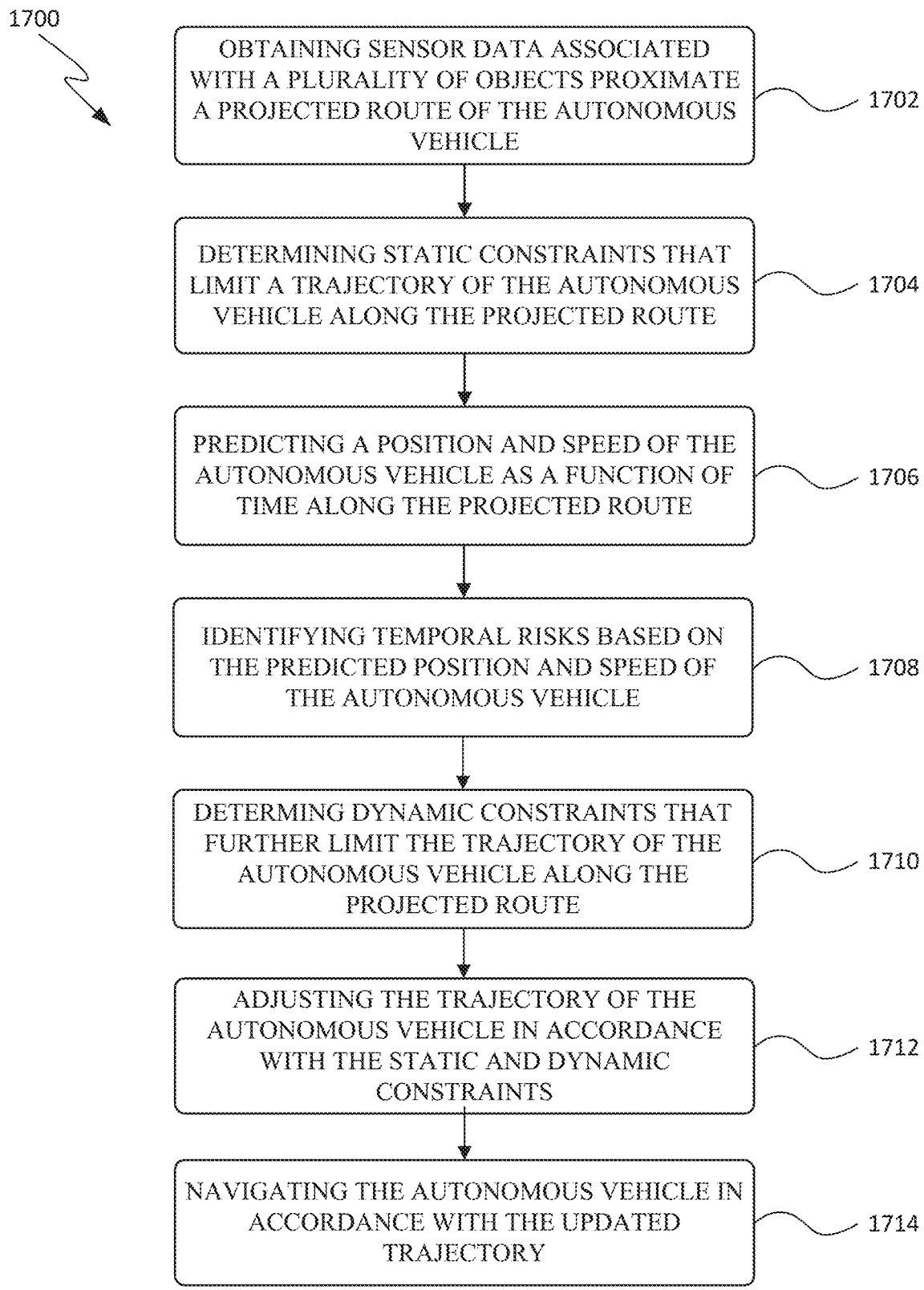
FIG. 17 is a flow chart of an example process 1700 for detecting objects in an environment and operating the vehicle based on the detection of objects.

Example Process for Detecting Objects and Operating the Vehicle Based on the Detection of the Objects FIG. 17 is a flow chart of an example process 1700 for detecting objects in an environment and operating an autonomous vehicle (e.g., AV 100) based on the detection of objects (e.g., 1406, 1504). For convenience, the process 1700 will be described as being performed by a system of one or more computers located in one or more locations. For example, the computing system 300 of FIG. 3, appropriately programmed in accordance with this specification, can perform the process 1700. In particular, at 1702 one or more sensors of an autonomous vehicle detect a plurality of objects proximate the autonomous vehicle's projected route. In some embodiments, sensors on nearby cars or mounted in nearby intersections can also be used to detect the presence of unexpected objects proximate the projected route. Sensor data generated by the sensors and associated with the plurality of objects is obtained by at least one processor of the autonomous vehicle. At 1704, the at least one processor determines static constraints that limit a trajectory of the autonomous vehicle. The static constraints prevent the autonomous vehicle from becoming subject to any non-temporal risks associated with a first subset of the plurality of objects. Non-temporal risks are generally risks that the processor determines are unlikely to change as the autonomous vehicle traverses the projected route.

At 1706, the at least one processor predicts a position and speed of the autonomous vehicle as a function of time along the projected route. In some embodiments, the predicted position and speed can be based on the maximum speed allowable by the static constraints. For example, in the case the only static constraint is a posted speed limit. The prediction could be based on the autonomous vehicle traveling at the posted speed limit. In some embodiment, the posted speed limit can be a soft static constraint as the processor can be allowed to set a trajectory of the autonomous vehicle that exceeds the posted speed limit in a case where doing so could be performed to avoid a collision or other undesirable event.

At 1708 the at least one processor is configured to identify and characterize temporal risks posed by a second subset of the plurality of objects. Characterization of the temporal risks can be based on historical data that helps the at least one processor predict future movement and/or change of state of the second subset of objects. For example, the historical data can include recordings showing how long a traffic signal takes to change from yellow to red. A confidence in the prediction can cause the at least one processor to be more or less conservative in making decisions about changes to the trajectory. For example, the processor might be less confident about the walking speed of a pedestrian than it is in the duration of a yellow light. Consequently, any dynamic constraints directed toward avoidance of the pedestrian would accommodate a larger range of walking speeds for the pedestrian.

At 1710, the at least one processor determines dynamic constraints based on the predicted position and speed of the autonomous vehicle. Performing the dynamic constraint calculation after determining the static constraints helps narrow down the options the autonomous vehicle has for avoiding less predictable detected objects that pose a temporal risk to the autonomous vehicle. For example, static constraints could be such that the autonomous vehicle isn't able to accelerate sufficiently to avoid a temporal risk and must instead decelerate to avoid damage or danger posed by the temporal risk.

At 1712 the at least one processor adjusts the trajectory of the autonomous vehicle in accordance with the static constraints and the dynamic constraints. It should be noted that the at least one processor may make changes to the dynamic constraints that result in additional adjustments to the trajectory. For example, a pedestrian could suddenly decide to run across a crosswalk or suddenly stop in the middle of a crosswalk. In such a case, the dynamic constraints would be updated resulting in a change to the trajectory to accommodate the updated dynamic constraint. At 1714 the at least one processor navigates the autonomous vehicle in accordance with the latest update to the trajectory.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A system, comprising:
at least one processor, and
at least one memory storing instructions thereon that, when executed by the at least one processor, cause the at least one processor to:
  obtain sensor data associated with a plurality of objects proximate a projected route of an autonomous vehicle;
  determine static constraints that limit a trajectory of the autonomous vehicle along the projected route, the static constraints comprising one or more objects of the plurality of objects not predicted to change status as the autonomous vehicle traverses the projected route;
  predict a position and speed of the autonomous vehicle along the projected route over time;
  identify one or more dynamic objects, the one or more dynamic objects comprising one or more objects of the plurality of objects predicted to change status as the autonomous vehicle traverses the projected route;
  determine one or more zones of temporal risk posed by the one or more dynamic objects, wherein to determine a first zone of temporal risk of the one or more zones of temporal risk posed by a first dynamic object of the one or more dynamic objects, the instructions cause the at least one processor to:
- determine, using a machine-learning model, a predicted status of the first dynamic object over time, wherein the machine-learning model is trained using historical data,
- determine a confidence level of the predicted status, wherein the confidence level is based at least in part on data collected about the first dynamic object and an estimated time to the first dynamic object, and
- determine, based on the predicted status and the confidence level of the predicted status, a spatial region around the first dynamic object in which an unsafe event is predicted to occur if the autonomous vehicle enters the spatial region;

determine, based on the predicted position and speed of the autonomous vehicle and the one or more zones of temporal risk, an acceleration profile for the autonomous vehicle;

update the trajectory of the autonomous vehicle along the projected route based on the static constraints and the acceleration profile; and navigate the autonomous vehicle based on the updated trajectory.

2. The system of claim 1, wherein the first dynamic object is a pedestrian in a crosswalk.

3. The system of claim 1, wherein the instructions further cause the at least one processor to update the trajectory after one or more zones of temporal risk are detected to be a threshold distance away from the projected route.

4. The system of claim 2, wherein a size of the first zone of temporal risk is determined based on a size of the crosswalk.

5. The system of claim 1, wherein the first dynamic object is a traffic light and the first zone of temporal risk associated with the traffic light extends across a majority of a traffic intersection associated with the traffic light.

6. The system of claim 5, wherein the instructions further cause the at least one processor to, in response to the traffic light turning yellow, determine an acceleration profile allowing the autonomous vehicle to enter the traffic intersection prior to the traffic light turning red.

7. The system of claim 6, wherein the historical data comprises an average amount of time for the traffic light to turn from yellow to red.

8. The system of claim 1, wherein to predict a position and speed of the autonomous vehicle along the projected route over time, the instructions further cause the at least one processor to determine a maximum possible speed profile for the autonomous vehicle.

9. The system of claim 1, wherein the plurality of objects proximate the projected route comprises one or more objects trailing the autonomous vehicle and wherein the acceleration profile comprises a maximum deceleration limit based upon the one or more objects trailing the autonomous vehicle at less than a threshold distance.

10. The system of claim 1, wherein the instructions further cause the at least one processor to:
- determine a type of each object of the plurality of objects proximate the projected route; and
- prioritize avoidance of zones of temporal risk associated with a first type of object over avoidance of zones of temporal risk associated with a second type of object based on the first type of object and the second type of object.

11. The system of claim 1, wherein the instructions further cause the at least one processor to determine a second zone of temporal risk associated with the first dynamic object of the one or more dynamic objects in response to a detected change in status of the first dynamic object.

12. The system of claim 1, wherein the first dynamic object is a pedestrian crossing a street outside of a crosswalk.

13. The system of claim 1, wherein the instructions further cause the at least one processor to activate an emergency collision avoidance system in response to a determination that sensor data from a sensor of the autonomous vehicle indicates an imminent collision.

14. The system of claim 1, wherein the acceleration profile is a first acceleration profile and the updated trajectory is a first updated trajectory, wherein the instructions further cause the at least one processor to:
- determine a second zone of temporal risk associated with the first dynamic object of the one or more dynamic objects in response to a determination that a status of the first dynamic object is different than a predicted status of the first dynamic object;
- determine a second acceleration profile for the autonomous vehicle based at least in part on the second zone of temporal risk,
- determine a second updated trajectory of the autonomous vehicle based at least in part on the second acceleration profile; and
- navigate the autonomous vehicle in accordance with the second updated trajectory.

15. The system of claim 14, wherein the instructions further cause the at least one processor to:
- determine that a vehicle on a crossing road is likely to enter an intersection at a same time as the autonomous vehicle;
- determine that the autonomous vehicle is too close to the intersection to stop in time to avoid entering the intersection; and
- accelerate the autonomous vehicle as it approaches the intersection and maintaining a higher speed than predicted through the intersection to avoid a collision with the vehicle on the crossing road.

16. The system of claim 1, wherein status comprises one of a location or state of an object.

17. The system of claim 1, wherein the unsafe event comprises a collision.

18. The system of claim 1, wherein the unsafe event comprises navigating the autonomous vehicle through a red light.

19. The system of claim 1, wherein the instructions further cause the at least one processor to:
- determine speed constraints, the speed constraints comprising at least one of a posted speed limit, a posted recommended speed, or a maximum speed of the autonomous vehicle; and
- predict a position and speed of the autonomous vehicle along the projected route over time based at least in part on the speed constraints and the static constraints.

20. The system of claim 19, wherein the instructions cause the autonomous vehicle to violate a speed constraint only when required to avoid an unsafe event.

21. The system of claim 1, wherein the instructions further cause the at least one processor to:

determine acceleration constraints, the acceleration constraints comprising at least one of an acceleration limit designed to prevent damage to a power train of the autonomous vehicle, or an acceleration limit designed to prevent tipping around a curve; and determine the acceleration profile for the autonomous vehicle based at least in part on the acceleration constraints.

22. The system of claim 1, wherein the confidence level of the predicted status is based at least in part on a distance between the first dynamic object and the autonomous vehicle.

23. A non-transitory computer-readable storage medium comprising instructions stored thereon that, when executed by at least one processor, cause the at least one processor to:

obtain sensor data associated with a plurality of objects proximate a projected route of an autonomous vehicle;

determine static constraints that limit a trajectory of the autonomous vehicle along the projected route, the static constraints comprising one or more objects of the plurality of objects not predicted to change status as the autonomous vehicle traverses the projected route;

predict a position and speed of the autonomous vehicle along the projected route over time;

identify one or more dynamic objects, the one or more dynamic objects comprising one or more objects of the plurality of objects predicted to change status as the autonomous vehicle traverses the projected route;

determine one or more zones of temporal risk posed by the one or more dynamic objects, wherein to determine a first zone of temporal risk of the one or more zones of temporal risk posed by a first dynamic object of the one or more dynamic objects, the instructions cause the at least one processor to:

determine, using a machine-learning model, a predicted status of the first dynamic object over time, wherein the machine-learning model is trained using historical data, determine a confidence level of the predicted status, wherein the confidence level is based at least in part on data collected about the first dynamic object and an estimated time to the first dynamic object, and determine, based on the predicted status and the confidence level of the predicted status, a spatial region around the first dynamic object in which an unsafe event is predicted to occur if the autonomous vehicle enters the spatial region;

determine, based on the predicted position and speed of the autonomous vehicle and the one or more zones of temporal risk, an acceleration profile for the autonomous vehicle;

update the trajectory of the autonomous vehicle along the projected route based on the static constraints and the acceleration profile; and navigate the autonomous vehicle based on the updated trajectory.

24. A method performed by an autonomous vehicle following a projected route, the method comprising:

obtaining sensor data associated with a plurality of objects proximate the projected route of an autonomous vehicle;

determining static constraints that limit a trajectory of the autonomous vehicle along the projected route, the static constraints comprising one or more objects of the plurality of objects not predicted to change status as the autonomous vehicle traverses the projected route for a particular duration;

predicting a position and speed of the autonomous vehicle along the projected route over time;

identifying one or more dynamic objects, the one or more dynamic objects comprising one or more objects of the plurality of objects predicted to change status as the autonomous vehicle traverses the projected route;

determining one or more zones of temporal risk posed by the one or more dynamic objects, wherein determining a first zone of temporal risk of the one or more zones of temporal risk posed by a first dynamic object of the one or more dynamic objects comprises:

determining, using a machine-learning model, a predicted status of the first dynamic object over time, wherein the machine-learning model is trained using historical data, determining a confidence level of the predicted status, wherein the confidence level is based at least in part on data collected about the first dynamic object and an estimated time to the first dynamic object, and determining, based on the predicted status and the confidence level of the predicted status, a spatial region around the first dynamic object in which an unsafe event is predicted to occur if the autonomous vehicle enters the spatial region;

determining, based on the predicted position and speed of the autonomous vehicle and the one or more zones of temporal risk, an acceleration profile for the autonomous vehicle;

updating the trajectory of the autonomous vehicle along the projected route based on the static constraints and the acceleration profile; and navigating the autonomous vehicle based on the updated trajectory.

* * * * *